United States Patent [19]

Morioka et al.

[11] Patent Number: 5,683,637
[45] Date of Patent: Nov. 4, 1997

[54] METHOD OF MOLDING EXPANDABLE STYRENE TYPE RESIN PARTICLES

[75] Inventors: Ikuo Morioka; Hiroyuki Yamagata, both of Nara; Mutsuhiko Shimada, Kyoto, all of Japan

[73] Assignee: Sekisui Kaseihin Kogyo Kabushiki Kaisha, Nara, Japan

[21] Appl. No.: 648,712

[22] Filed: May 16, 1996

Related U.S. Application Data

[62] Division of Ser. No. 281,660, Jul. 28, 1994, Pat. No. 5,580,649.

[30] Foreign Application Priority Data

Jul. 30, 1993 [JP] Japan ................................ 5-189678
Jul. 11, 1994 [JP] Japan ................................ 6-158879

[51] Int. Cl.$^6$ ............................................. B29C 44/02
[52] U.S. Cl. ............................................. 264/53; 264/126
[58] Field of Search ................... 521/56, 59; 264/53, 264/126

[56] References Cited

U.S. PATENT DOCUMENTS

| | | | |
|---|---|---|---|
| 2,857,340 | 10/1958 | Colwell | 521/59 |
| 3,996,311 | 12/1976 | Westphal et al. | 525/316 |
| 5,290,819 | 3/1994 | Witt et al. | 521/56 |

FOREIGN PATENT DOCUMENTS

| | | | |
|---|---|---|---|
| 6-49263 | 2/1994 | Japan | 521/59 |
| 94 25516 | 11/1994 | WIPO | 521/56 |

*Primary Examiner*—Allan R. Kuhns
*Attorney, Agent, or Firm*—Nikaido, Marmelstein, Murray & Oram LLP

[57] ABSTRACT

A foamed article of styrene type resin, in which base resin particles are styrene type resin particles obtainable by a graft polymerization of a cis-rich polybutadiene with a styrene type monomer, a blowing agent contains n-pentane as its main component and the foamed article shows a density of 0.015–0.040 g/cm$^3$, an average foam diameter of 60–300 micrometers and a closed cell foam rate of not less than 50%.

3 Claims, No Drawings

METHOD OF MOLDING EXPANDABLE STYRENE TYPE RESIN PARTICLES

This is a division, of application Ser. No. 08/281,660, now U.S. Pat. No. 5,580,649 filed Jul. 28, 1994.

BACKGROUND OF THE INVENTION

1. Field of the Invention

The present invention relates to expandable styrene type resin particles and molded foamed articles obtained from said particles. More particularly, it relates to styrene type resin foamed articles which exhibit excellent elasticity and impact resistance and can be conveniently used as a cushion packing material and a heat insluating material and also relates to the expandable styrene type resin particles (beads) which are used for the manufacture of said foamed article as well as to a method of manufacturing said foamed article.

The foamed article of a styrene type resin in accordance with the present invention can be especially preferably used in the form of a cushion packing material for various kinds of office automation machines, audio machines, domestic electric devices, etc.

2. Related Art

A foamed article of a styrene type resin in which expanded particles are fused to each other can be prepared by heating expandable styrene type resin beads containing a blowing agent with steam or the like and again heating the pre-expanded beads in a mold. However, the resulting foamed article of a styrene type resin has little elasticity and has a disadvantage of being easily damaged by impact. Therefore, its use is rather limited.

In general, molded foamed articles of the polyolefin type such as polyethylene, polypropylene, etc. have excellent impact resistance. However, in the case of the expandable polyolefin type resin particles used for the manufacture of such molded foamed article, a blowing agent which is impregnated therein is apt to easily escape and, therefore, it is necessary that they be promptly subjected to a pre-expansion to give the foamed particles. In addition, it is necessary for preparing a good foamed article to give an inner pressure by, for example, means of air to the pre-expanded particles and to mold them quickly before the inner pressure decreases or to fill them into a mold (which is able to enclose the pre-expanded particles in a compressed state to an extent of 30–50% and does not gas-tightly enclose them) followed by subjecting them to molding in the mold. For such a molding process, special auxiliary devices are necessary for the pre-expansion and the molding.

Under such circumstances, some attempts have been made for improving the impact resistance of the molded products by the use of a high impact polystyrene resin (hereinafter, referred to as an HIPS resin) which is an improved article of polystyrene resin with a butadiene rubber. For example, expandable resin particles using the HIPS resin are disclosed in the Japanese Patent Publications Sho 47/18428 and Sho 51/46536.

However, when those expandable styrene type resin particles are subjected to a pre-expanding immediately after having been taken out from a vessel in which a blowing agent is impregnated therein or from a polymerization impregnating vessel, the size of the cells in the pre-expanded particles are not uniform. Accordingly, when the expandable styrene type resin particles impregnated with a blowing agent are subjected to a pre-expanding, it is necessary to conduct an aging until the cells of the pre-expanded particles are made uniform so that the molding is possible. However, in the case of the above-mentioned conventional expandable styrene type resin particles, there is a problem in that they are usually stored and aged in a store house kept at a low temperature for as long as about twenty days.

Further, though the HIPS resin inherently greatly improves that the impact resistance of the polystyrene particles, there is a problem that, when the HIPS resin is made into a molded foamed article, the impact of the molded foamed article is hardly improved.

This is because, when the pre-expanding is carried out upon completion of the aging of said resin particles, the cells of the pre-expanded particles are very fine. The fine cells, i.e. the cells with very small diameters, are in a state such that their cell membranes are very thin and are easily damaged. Accordingly, they are broken at the time of the pre-expanding or further at the time of the molding due to applied vapor pressure whereby the foamed molded article with only a small proportion rate of closed cells foams (less than 50% of closed cells) results.

The foamed molded article with a low proportion of closed cell foam is destroyed due to it having no efficient means of absorption of impact or, even if released from impact stress, it does not recover to the original shape and, when impact stress is applied repeatedly, the article cannot be used as a cushion packing material.

When a large amount of the polybutadiene component is further added in order to improve impact resistance, heat resistance is deteriorated and, upon molding, (partial) melting occurs on the outer part of the molded foamed article whereby it is not possible to afford a foamed article with satisfactory properties. Accordingly, there is a disadvantage that impact resistance is rather lowered.

In the Japanese Laid-Open Publications Sho-54/154471 and Sho-54/158467, there is a disclosure of expandable styrene type resin particles wherein a blowing agent is impregnated into a resin composition prepared by a mechanical mixing of a block copolymer of styrene/butadiene with a styrene type resin and, in the Japanese Laid-Open Publication Hei-03/182529, there is a disclosure of expandable resin particles wherein a blowing agent is impregnated into a resin composition prepared by a mechanical mixing of a block copolymer .of a hydrogenated styrene/butadiene with an HIPS resin. It is noted that the foamed article prepared by foaming and molding those expandable resin particles exhibits some improved impact resistance as compared with the conventional foamed HIPS articles.

However, such block copolymers are considerably expensive and, therefore, the use of the block copolymer in large quantities is disadvantageous in terms of cost and its industrial application is difficult. In addition, the above-mentioned resin prepared by mixing the block copolymer with the HIPS resin is hard to foam highly and there is another disadvantage that a highly-foamed article with a density of 0.040 g/cm$^3$ or less cannot be prepared. Moreover, the cells of the pre-expanded particles obtained from said resin are finer and, when they are made into a molded foamed article, the degree of fusion is worse whereby it is not possible to produce an a article with good elasticity.

SUMMARY OF THE INVENTION

In order to solve the problems as mentioned above, the present inventors have carried out further investigations on a styrene type resin improved by a butadiene rubber and found that, when n-pentane is used as a main component of a blowing agent and further when a resin (styrene type resin particles) obtained by a graft polymerization of a styrene type monomer in the presence of a cis-rich polybutadiene is used as a styrene resin improved by a butadiene rubber, the phenomenon of producing fine cells in the pre-expanded particles after completion of the aging is improved and a foamed article with excellent elasticity and impact resistance is prepared whereupon the present invention has been achieved.

Thus, the present invention provides a foamed article of styrene type resin, in which the base resin particles are styrene type resin particles obtainable by a graft polymerization of a cis-rich polybutadiene with a styrene type monomer, a blowing agent contains n-pentane as its main component and the foamed article shows a density of 0.015–0.040 g/cm$^3$, an average cell diameter of 60–300 micrometers and a closed cell foam proportion of not less than 50%.

DESCRIPTION OF THE PREFERRED EMBODIMENTS

With regard to the styrene type resin particles used in the present invention, the resins which are known and are commercially available may be used. For example, the resins disclosed in the Japanese Patent Publication Sho 61/11965 can be used and said disclosure will now be incorporated herein by reference. Thus, the resin particles mentioned in said patent can be prepared by a bulk polymerization or by a bulk-suspension two-step polymerization of a styrene type monomer in the presence of a cis-rich polybutadiene and are supposed to be a graft polymer comprising a rubber-like elastic substance and a styrene type polymer.

The styrene type monomer which can be used here is a styrene monomer (inclusive of styrene and its homologues) or a mixture of monomers consisting of a styrene monomer as a main component with a vinyl monomer which is copolymerizable therewith such as acrylonitrile, methacrylonitrile, acrylic acid, methacrylic acid, methyl methacrylate and maleic anhydride.

On the other hand, the cis-rich polybutadiene used is that which contains not less than 90% by weight (preferably 96–98% by weight) of cis-1,4-bond therein.

The styrene type resin particles (cis-rich HIPS resin) in accordance with the present invention are dissolved, for example, in chloroform and filtered to remove rubbery components and the molecular weight of the resin (supposed to be a styrene portion forming a matrix in the styrene type resin particles) contained in the solution is measured whereby the molecular weight is 200,000–400,000 preferably 220,000–270,000. The styrene type resin particles with the molecular weight of 200,000–400,000 give expandable styrene type resin particles by the conventional manufacturing methods. When the molecular weight is less than 200,000, the heat resistance during the molding process lowers and the molding conditions for giving the molded article with good physical properties which are an object of the present invention is within a very narrow range whereby it is not possible to make a good molded article with good reproducibility. On the other hand, when the molecular weight is more than 400,000, it is difficult to produce a molded article with a high foaming ratio.

In the present invention, the amount of the cis-rich polybutadiene component in the styrene type resin particles is preferably 6–15% by weight, more preferably 8–12% by weight. The content of the cis-1,4-bond in the cis-rich polybutadiene is preferably 80% or more, more preferably 90% or more. When the amount of the cis-bond is less than 80%, it is not possible to inhibit the phenomenon that cells of the pre-expanded particles become extremely fine before the completion of the aging.

A rubbery substance may be added, either by fusing or mixing, within an amount of not more than 10 parts by weight to 100 parts by weight of the styrene type resin particles for improving the quality of the styrene type resin particles within such a range that the object of the present invention is not inhibited. Examples of such rubbery substance are styrene-butadiene block copolymers, styrene-butadiene random copolymers, styrene-isoprene block copolymers, styrene-isoprene random copolymers, cis-poor polybutadienes and hydrogenated copolymers thereof.

Moreover, the polystyrene type resin particles used in the present invention may, if necessary, contain various kinds of additives: antioxidants, lubricants (e.g. liquid paraffin, fatty acid esters, metal soaps, etc.), flame retardants, auxiliary flame retardants, antistatics, and the like.

In the present invention, a blowing agent mainly comprising n-pentane is used. The blowing agent contains at least 50% by weight, preferably not less than 70% by weight, of n-pentane. The blowing agent containing 70% or more n-pentane is available, for example, from Showa Shell Sekiyu KK. Pure n-pentane is available too and can be used as well. As a remaining portion, the blowing agent may contain volatile organic compounds with a boiling point of 100° C. or lower at atmospheric pressure which have been known as blowing agents for a styrene type resin particles such as propane, n-butane, isobutane, methyl chloride, dichlorodifluoromethane, etc. besides isopentane.

The foamed article of the styrene type resin of the present invention has a density of 0.015–0.040 g/cm$^3$, an average cell diameter of 60–300 micrometers (preferably 100–200 micrometers) and a closed cell foam proportion of not less than 50%.

The foamed article of the styrene type resin has good flexibility if its density is less than 0.015 g/cm$^3$. However, in terms of the impact resistance, there is not much difference between this low density material and the conventional homopolystyrene resin and there is a little merit in trying to improve the impact resistance of this low density material using the cis-rich polybutadiene. On the contrary, when the density is more than 0.040 g/cm$^3$, the impact resistance is good but the flexibility lowers whereupon the article is not suitable for use as a cushion packing material exhibiting both elasticity and impact resistance which are the objects of the present invention.

When the average cell diameter of the foamed article of the styrene type resin is less than 60 micrometers, the thin cell membrane is apt to be broken and the product has inferior impact resistance and, in addition, its recovery after the impact reduces as well. The higher the average cell diameter, the better the recovery but, when said cell diameter is more than 300 micrometers, open cells are partially formed whereby the recovery becomes rather bad.

When the closed cell foam rate of the foamed molded article is less than 50%, the elasticity lowers and the ability of recovery is inferior. Further, as a result of the fact that the cells are not closed but are open, the impact resistance lowers.

The styrene type resin foamed article of the present invention contains 0.2–4.0% by weight (preferably 0.5–3.5% by weight) of a blowing agent. When the amount of the blowing agent in the foamed article is less than 0.2% by weight, the rigidity of the foamed article increases and, when an impact is applied, the article is apt to be broken while, when the amount is more than 4.0% by weight, the article is softness too soft and is without elasticity and, therefore, there is a problem of inferior recovery.

There is no particular limitation for the use of the styrene type resin foamed article in accordance with the present invention but, taking its properties of excellent elasticity and impact resistance, it can be used for a cushion packing material for various types of office automation machines, audio machines, domestic electric devices, etc. The use as a cushion packing material for relatively heavy machines of about 10 to 50 kg is particularly preferred.

It is necessary that the above-mentioned foamed article contains 0.2–4.0% by weight of a blowing agent at the occasion when it is used as a cushion packing material or the like so that it can keep its elasticity and impact resistance.

In accordance with another aspect of the present invention, expandable styrene type resin particles (beads) are offered for the manufacture of the above-mentioned foamed article of the styrene type resin and said expandable resin particles contain 3–10% by weight, preferably 5–8% by weight, of a blowing agent.

Impregnation of the blowing agent into the styrene type resin particles can be carried by suspending cylindrical pellets of the styrene type resin in an aqueous medium and compressing the blowing agent into the suspension in an autoclave, where the cylindrical pellets are obtained by extruding the styrene type resin through an extruder to yield strands thereof and cutting them. Alternatively the impregnation can be carried by compressing the blowing agent in an autoclave during or proceeding after a suspension—polymerization of styrene resin particles.

The amount of the blowing agent added to 100 parts by weight of the resin particles is usually 5–15 parts by weight preferably 7–12 parts by weight. When the amount is less than 5 parts by weight, a long time is needed for the impregnation while, when it is more than 15 parts by weight, much blowing agent which is not impregnated into the resin particles remain in the container and that is not economical.

The blowing agent which is added as such is contained in the resulting expandable resin particles in an amount of 3–10% by weight preferably 5–8% by weight. When the amount of the blowing agent is less than 3% by weight, the expected high foaming ratio is not achieved when the particles are heated to give pre-expanded particles. When it is more than 10% by weight, the time needed for the aging for the expandable styrene type resin particles is longer or the diameter of the cells in the resulting pre-expanded particles is too big whereby a significant decrease in the impact strength results which is undesirable.

The impregnation of the blowing agent into the styrene type resin particles using an aqueous medium is carried out at a temperature of 100°–150° C. preferably 110°–130° C. When the temperature for impregnation is lower than 100° C., and the starting styrene type resin particles are used in the form of cylindrical pellets, the shape of the resulting expandable styrene type resin particles are not spherical. When the expandable resin particles are heated and the resulting pre-expanded particles are filled in a mold, the foamed particles cannot be uniformly filled therein if the shape of the mold is complicated or there is a thin portion in said mold. On the other hand, when the temperature for impregnation is higher than 150° C., stability of the suspension lowers whereby lumping of the expandable styrene type resin particles is apt to take place.

The time for impregnation of the blowing agent varies depending upon the size (volume) of the starting styrene type resin particles and is not particularly limited. For example, when the volume of the particle (bead) is about 1.0 mm$^3$, the time is not shorter than four hours preferably not shorter than six hours. When the time for impregnation is shorter than four hours, the unimpregnated portion, called a core, is formed at the center of the styrene type resin particles and, when the pre-expanded particles are prepared, both foamed and unfoamed portions are present in one foamed particle whereupon the foamed molded article obtained from said foamed particles does not exhibit the desired property.

The above-mentioned aqueous medium may contain various kinds of additives which have been commonly used for preparing expandable resin particles such as dispersing agents, suspending agents, surface-active agents, auxiliary blowing agents (solvents and plasticizers), lubricants, etc.

Examples of the auxiliary blowing agents are toluene, ethylbenzene, cyclohexane, isoparaffin, etc. Usually, the auxiliary blowing agents are added to the resin in an amount of not more than 2.0% by weight preferably not more than 1.0% by weight.

The expandable styrene type resin particles containing the blowing agent which is mainly composed of n-pentane prepared as such is aged for certain period (e.g. at 10°–25° C. for 24–48 hours) to give a commercial article.

Said expandable styrene type resin particles may, if required be heated to give pre-expanded particles followed by making them into a foamed article using a mold having a predetermined shape.

The pre-expansion can, for example, be carried out by introducing steam having a vapor pressure of about 0.05 kg/cm$^2$ under pressure into a pre-expansion device. The time for the introduction is usually 30 to 180 seconds. The resulting pre-expanded particles are allowed to stand for about one day preferably at an ambient temperature and subjected to a foam molding (a secondary foaming).

The foam molding can be carried out by introducing steam for example, with a heated steam pressure of 0.1–1.0 kg/cm$^2$G into a mold which is not gas-tight. The resulting molded foamed article is cooled and is taken out from the mold.

Incidentally, in adjusting the average cell size of the foamed article, known art which is commonly used in the manufacture of conventional foamed article of polystyrene type may be used. Thus, in order to make the average cell size smaller, an amide compound or a nonionic surface-active agent is added during the stage of impregnation of n-pentane into the resin particles in an aqueous medium whereby the cell size can be adjusted. In order to make the cell size bigger on the contrary, the amount of n-pentane is made larger in impregnating it or the temperature for impregnation is made higher so that the adjustment is possible.

The present invention will be further illustrated by way of the following examples though the present invention is not limited thereby at all.

EXAMPLES

Example 1. (A manufacturing example of the expandable styrene type resin particles)

Expandable styrene type resin particles were manufactured in accordance with the following method.

1. A manufacturing example of a styrene type resin with a weight average molecular weight (Mw) of 200,000 to 270,000:

Into a 5.6-liter (inner volume) autoclave were added 2 liters of water, 30 g of magnesium chloride (a suspending agent) (trade name: Softwafer; manufactured by Akaho Kasei KK), 15 g of anhydrous pyrophosphoric acid (trade name: STD; manufactured by Taikei Kagaku Kogyo KK), 1.5 g of sodium dodecylbenzenesulfonate (trade name: Teepol B-81; manufactured by Daiichi Kogyo Seiyaku KK) and 0.75 g of 12-hydroxystearic acid amide (a promoter for adjusting and aging the foams) (trade name: Diamid KH; manufactured by Nippon Kasei KK) to prepare an aqueous medium, then 1,500 g of a cis-rich HIPS resin particles made into pellets of 1.0 mm length and 0.8 mm diameter by extruding a styrene type resin (trade name: Topolex 890-51; manufactured by Mitsui Toatsu KK) obtained by a graft polymerization of a styrene type monomer with a cis-rich polybutadiene containing 97% of cis-bonds with a weight averge molecular weight (Mw) of 250,000 was suspended therein and the stirring rate was adjusted to 350 rpm. After that, the temperature was raised to 125° C. and 150 g of n-pentane (manufactured by Showa Shell Sekiyu KK) was compressed thereinto utilizing a nitrogen gas. Then the mixture was kept at that temperature for six hours or longer, cooled down to 30° C. and taken out to give the expandable styrene type resin particles.

The particles contained 6.5% by weight of the blowing agent.

2. A manufacturing example of the styrene type resin with a weight average molecular weight (Mw) of 270,000 to 400,000:

The same operations as in the above-mentioned 1. were carried out with the exception that 0.75 g of toluene (manufactured by Mitsubishi Oil) was added as an auxiliary blowing agent to the aqueous medium to give an emulsion using a homomixer and 1,500 g of a styrene type resin particles manufactured by a graft polymerization of a styrene type monomer with a cis-rich polybutadiene with a weight average molecular weight (Mw) of 300,000 was suspended therein to give the expandable styrene type resin particles.

The content of the blowing agent therein was 6.7% by weight.

The weight average molecular weight (Mw) and the content of the blowing agent were measured by the following methods.

[Weight Average Molecular Weight (Mw)]

In the present invention, the weight average molecular weight was measured as follows. Thus, the styrene type resin was dissolved in chloroform as a solvent therein and filtered to remove the rubbery substances, and the molecular weight of the resin in the solution prepared as such was measured by means of a GPC (gel permeation chromatography) under the following conditions.

Apparatus used for the Measurement: An HPLC apparatus manufactured by Waters;

Column: Microsquirra Gel (manufacture by Waters) $10^3$, $10^4$, $10^5$ and $10^6$ Å (four in total);

Column Temperature: 40° C.;

Mobile Phase: Chloroform; and

Measurement of the Molecular Weight of the Sample: In measuring the molecular weight of the sample, the measuring condition was chosen as follows. Thus, the molecular weight distribution of the sample was included within a range where the logarithm of the prepared working curve and the counted number is within a linear relation prepared by several monodispersed polystyrene standard samples.

Incidentally, the working curve of the polystyrene in this measurement was prepared using eight polystyrene standard samples with the weight averager molecular weights of $5.80 \times 10^2$ $2.70 \times 10^3$, $50 \times 10^3$, $3.03 \times 10^4$, $1.06 \times 10^5$, $4.02 \times 10^5$ ad $3.11 \times 10^6$ (manufactured by Waters) and of $1.03 \times 10^6$ (manufactured by Shodex).

[Content of the Blowing Agent]

In the present invention, the amount of the blowing agent in the expandable styrene type resin particles was measured by means of a gas chromatography under the following conditions.

Apparatus Used for the Measurement: Gas Chromatography GC-6AM (manufactured by Shimadzu);

Apparatus Used for the Pyrolytic Measurement: Pyrolyzer PYR-1A (manufactured by Shimadzu);

Column Temperature: 150° C.;

Filler: Polapack Type P (manufactured by Gas Chro Kogyo KK);

Mobile Phase: Highly Pure Nitrogen;

Flow Rate of the Mobile Phase: 60 ml/minute;

Pressure of the Mobile Phase: 3 kg/cm$^2$G; and

Detector: FID (manufactured by Shimadzu).

Example 2

The styrene type resin particles (the amount of the cis-rich polybutadiene in the resin being 10% by weight) prepared by a graft polymerization of styrene monomer in the presence of polybutadiene containing 97% of cis-substances was used and made into cis-rich HIPS resin particles in pellets (1.0 m length; 0.8 mm diameter) using an extruder.

Then 100 parts by weight of cis-rich HIPS resin particles, 130 parts by weight of water, 0.2 part by weight of magnesium pyrophosphate and 0.01 part by weight of sodium dodecylbenzenesulfonate were placed in a 50-liter autoclave equipped with a stirrer, the temperature was raised up to 120° C., 10 parts by weight of n-pentane was compressed thereinto, the mixture was kept at 120° C. for six hours, cooled to 30° C. and the expandable styrene type resin particles were taken out.

The resulting expandable styrene type resin particles were stored in a chamber which was kept at 25° C., subjected to a pre-expansion with lapse of time to check the foamed state of the pre-expanded particles and it was confirmed that, on the third day after it was taken out from the autoclave, the cells became uniform and the aging was completed. The resulting expandable styrene type resin particles were stored for seven days more in said chamber followed by subjecting to a pre-expansion. The pre-expanding was carried out under the following conditions. Thus, 375 g of the expandable styrene type resin particles were deposited in a batch pre-expansion machine with an inner volume of 32 liters (effective volume: 25 liters) and, under the conditions of a steam pressure of 0.05 kg/cm$^2$G with a little aeration, the pre-expanded particles with a bulk density of 0.015 g/cm$^3$ were obtained. The temperature of the steam at that time was 98°–100° C.

The resulting pre-expanded particles were allowed to stand for 24 hours filled in a mold (inside cavity size:300× 400×100 mm) and further heated using a molding machine of ACE-3 type (manufactured by Sekisui Koki Seisakusho KK) to give a molded foamed article with a density of 0.025 g/cm$^3$. The molding conditions were as follows:

A time for supplying a steam in case of heating on from one side of the cavity to another side: 0.1 kg/cm$^2$G×10 seconds A time for supplying a steam in case of heating on all surfaces of the cavity: 0.6 kg/cm$^2$G×20 seconds Time for cooling with water: 25° C. for 40 seconds Degree of vacuum for the mold after water cooling: 50 cmHg Pressure of surface of foamed article when is taken off from mold: 0.1 kg/cm$^2$G In the molded foamed article which was taken out, the cells were uniform, the average cell diameter was 130 micrometers and the closed cell foam rate was not less than 50%. In addition, the resulting molded foamed article was with a good fusion of foamed particles and was with a good outer appearance having no shrinking.

The closed cell foam rate was measured by the following method.

[Closed cell Foam Rate]

The real volume of the test piece volume (28 cm$^3$) with known density was measured using a highly precious automatic volume meter (type VM 100; manufactured by KK Estech) and the closed cell foam rate was calculated from the following formula. Closed Cell Foam Rate (%)={(E-D/ρ)/(F-D/ρ)}×100 in which D: weight (g) of the test piece E: real volume of the test piece <measured value(cm$^{3 \&l}$)>

F: apparent volume of the test piece <measured value (cm$^3$)>

F: density of the resin used for the test piece (g/cm$^3$)

The resulting molded foamed article was subjected to the following evaluations on the elasticity and on the impact resistance. The result is given in Table 1. It is apparent from Table 1 that the molded foamed article of styrene type resin according to the present invention was with excellent elasticity and impact resistance.

With regard to the evaluation on the elasticity, a test sample of 50×50×50 mm was cut out from the resulting molded foamed article and its compressive strength and recovery of compressive strain were measured as follows.

[Compression Strength]

The measurement was carried out in accordance with JIS A-9511. Thus, the test sample was compressed at the rate of 10 mm/min and the stress (kgf/cm$^2$) causing a compression strain of 25% was calculated.

The criteria for judging the compression strength was that o, Δ and x stand for the stress (kgf/cm$^2$) of less than 1.6, 1.6–1.8 and more than 1.8, respectively.

[Recovery Rate of the Compression Strain]

The measurement was carried out in accordance with JIS A-9511. Thus, the test sample was compressed at the rate of 10 mm/min and, after the compression strain of 80% was resulted, the test sample was taken out and calculated as follows.

Recovery Rate (%)=(L/50)×100 in which L is a size to the direction of compression after recovery.

The criteria for judging the recovery rate was that o, Δ and x stand for more than 80%, 70–80% and less than 70%, respectively.

With regard to the evaluation on impact resistance, the test sample of 20×40×200 mm was cut out from the resulting foamed molded article and the falling ball value was measured as follows.

[Falling Ball Value]

The measurement was carried out in accordance with JIS K-6745 6.4.1. Thus, a test piece of 20×40×215 mm was cut out from the molded article, both ends of the test piece were fixed between two supports with an interval of 150 mm and a steel ball of 198 g was fallen down in center of the test piece. The falling height of the steel ball was repeated with a certain level and the tests were carried out by varying the heights in every 5 cm from the lowest height where all of the five test pieces were destroyed to the highest height where all test pieces were not destroyed. The falling ball value was then calculated from the following formula.

Falling Ball Value (cm) =H$_{50}$=H$_L$–ΔH×(S/100–½) in which H$_{50}$: a 50% destruction height<falling ball value (cm)>

H$_L$: the lowest height (cm) for a 100% destruction

ΔH: varied height (5 cm)

S: total sum (%) of the % destroyed at each height

The criteria for judging the falling ball value is that o, Δ and x stand for more than 30 cm, 20–30 cm and less than 20 cm, respectively.

Example 3

The same operations as in Example 2 were carried out with the exception that a resin in which the amount of the cis-rich polybutadiene in the styrene type resin particles was 7% by weight was used and elasticity and impact resistance of the resulting molded foamed article were evaluated. Days needed for aging were three days and the cells of the resulting foamed molded article were uniform. The average cell diameter was 110 micrometers and the closed cell foam rate was 85%.

It is apparent from Table 1 that the resulting molded foamed article of this styrene type resin was with excellent elasticity and impact resistance.

Comparative Examples 1 and 2

The same operations as in Example 2 were carried out with the exception that the blowing agent was changed to n-butane (Comparative Example 1) or isobutane (Comparative Example 2) and 1.5 parts by weight of toluene was used as the auxiliary blowing agent and elasticity and impact resistance of the resulting foamed molded article were evaluated. The days needed for aging were eight and seven days, respectively. Though the cells in the resulting foamed molded articles were uniform, their average cell diameters were as fine as 45 and 40 micrometers, respectively and, in addition, the outer appearances were no good because of shrinking. The elasticity and the impact resistance were found to be inferior as given in Table 1.

Comparative Examples 3 and 4

The same operations as in Example 2 were carried out with the exception that the blowing agent was changed to isopentane (Comparative Example 3) or to freon-11 (Comparative Example 4) and elasticity and impact resistance of the resulting foamed molded articles were evaluated.

The days needed for aging were 2 and 14 days, respectively. Though the cells of the resulting foamed molded articles were uniform, their average cell diameters were as fine as 50 and 55 micrometers, respectively and it is apparent from Table 1 that the resulting foamed molded articles were with inferior elasticity and impact resistance.

Comparative Example 5

The same operations as in Example 2 were carried out with the exception that the styrene type resin particles containing cis-poor polybutadiene (the amount of the cis-poor polybutadiene in the resin was 10% by weight) prepared by polymerizing a styrene monomer in the presence of cis-poor polybutadiene (the content of the cis-substance: 35%) was used and 10 parts by weight of n-pentane was used as a blowing agent and elasticity and impact resistance of the resulting foamed article were evaluated.

The days needed for aging was 20 days. Though the cells of the resulting foamed molded article were uniform, the average cell diameter was as fine as 50 micrometers and it is apparent from Table 1 that the resulting foamed molded article was with inferior elasticity and impact resistance.

From the above-mentioned examples and comparative examples, it is clear that, only in the combination where the base resin particles are cis-rich polybutadiene-containing styrene type resin particles and the blowing agent is n-pentane, the cells in the resulting foamed molded article are not extremely fine and both elasticity and impact resistance are excellent.

impregnating temperature were changed as shown in Table 2 and elasticity and impact resistance of the resulting molded foamed articles were evaluated.

The days needed for aging were two days and four days, respectively. Moreover, the cells of the resulting molded foamed articles were uniform and their average cell diameters were 55 micrometers (Comparative Example 6) and 420 micrometers (Comparative Example 7).

It is clear from Table 2 that the resulting molded foamed articles were with inferior elasticity and impact resistance.

Comparative Examples 8 and 9

The same operations as in Example 2 were carried out with the exception that the styrene type resin particles of Comparative Example 5 (the amount of the cis-poor polybutadiene in the resin was 10% by weight) was used and the amount of n-pentane and the impregnating temperature were changed as shown in Table 2 and elasticity and impact resistance of the resulting molded foamed articles were evaluated.

TABLE 1

| | Base Resin Particles | Blowing Name | Agent Amount (Parts by wt) | Av. Cell Diameter of the Article (micrometers) | Elasticity * | Impact Resistance ** | # |
|---|---|---|---|---|---|---|---|
| Example 2 | cis-Rich HIPS | n-Pentane | 10 | 130 | o | o | o |
| 3 | " | " | 10 | 110 | o | o | o |
| Comp. Ex. 1 | cis-Rich HIPS | n-Butane | 10 | 45 | x | x | x |
| 2 | " | Isobutane | 10 | 40 | x | x | x |
| 3 | " | Isopentane | 10 | 50 | x | x | x |
| 4 | " | from 11 | 10 | 55 | Δ | x | x |
| 5 | cis-Poor HIPS | n-Pentane | 10 | 50 | Δ | x | x |

Density of the foamed molded article: 0.025 g/cm$^3$
*: Compressive strength
**: Recovery rate of compressive strain
: Falling ball value Examples 4–6

The same operations as in Example 2 were carried out with the exception that the amount of n-pentane and the impregnating temperature were changed as shown in Table 2 and elasticity and impact resistance of the resulting molded foamed articles were evaluated.

The days needed for the aging were three days for all cases. Cells of the resulting foamed molded articles were uniform and their average cell diameters were 100 micrometers (Example 4), 80 micrometers (Example 5) and 270 micrometers (Example 6).

It is apparent from Table 2 that the resulting molded foamed articles were with excellent elasticity and impact resistance.

Comparative Examples 6 and 7

The same operations as in Example 2 were carried out with the exception that the amount of n-pentane and the The days needed for aging were 18 and 20 days, respectively. Though the foams of the resulting molded foamed articles were uniform, their average cell diameters were as fine as 55 micrometers (Comparative Example 8) and 55 micrometers (Comparative Examples 9).

From the above-mentioned examples and comparative examples, it is understood that only such molded foamed article wherein the combination is that the base resin particles are cis-rich polybutadiene-containing styrene type resin particles and the blowing agent is n-pentane and wherein the average cell diameter is within a range of 60 to micrometers is with excellent elasticity and impact resistance and it is noted from Table 2 that the resulting foamed molded articles were with superior elasticity and impact resistance.

TABLE 2

|  | Base Resin Particles | Blowing Agent (n-Pentane) Parts by Wt | Impregnating Temp (°C.) | Av. Cell Diameter of the Articles (micrometers) | Elasticity * | Impact Resistance ** | # |
|---|---|---|---|---|---|---|---|
| Example 2 | cis-Rich HIPS | 10 | 120 | 130 | o | o | o |
| 4 | " | 8 | 120 | 100 | o | o | o |
| 5 | " | 8 | 110 | 80 | o | o | o |
| 6 | " | 10 | 140 | 270 | o | o | o |
| Comp. Ex. 6 | cis-Rich HIPS | 6 | 90 | 55 | o | x | x |
| 7 | " | 12 | 140 | 420 | o | Δ | x |
| 8 | cis-Poor HIPS | 12 | 120 | 55 | Δ | x | x |
| 9 | " | 12 | 140 | 55 | Δ | x | x |

Density of the molded foamed article: 0.025 g/cm³
*: Compressive strength
**: Recovery rate of compressive strain
: Falling ball value Examples 7–9 and Comparative Examples 10–12

The same operations as in Example 2 were carried out with the exception that the density of the foamed article was made 0.015 g/cm³ and the pressure of the heated steam into the mold during the molding of steam heating (heating on all surfaces of the cavity) was changed to give the molded articles. The closed cell foam rate and physical properties of the resulting foamed articles were measured by the same manner as in Example 2 and the result is given in Table 3.

TABLE 3

|  | Steam Pressure (kg/cm²G) | Closed Cell Foam Rate (%) | Compressive Strength | Recovery Rate of Compressive Stress | Falling Ball Value |
|---|---|---|---|---|---|
| Comp. Ex. 10 | 1.0 | 30 | o | x | x |
| 11 | 0.9 | 32 | o | x | x |
| 12 | 0.8 | 40 | o | x | x |
| Example 7 | 0.7 | 50 | o | o | o |
| 8 | 0.6 | 52 | o | o | o |
| 9 | 0.5 | 53 | o | o | o |

Density of the molded foamed article: 0.015 g/cm³

Each of the physical properties in Table 3 are given according to the evaluating standard as given in the following Table 4.

TABLE 4

|  | Compressive Strength (kg/cm2) | Recovery Rate of Compressive Stress (%) | Falling Ball Value (cm) |
|---|---|---|---|
| o | 0.9> | 85< | 25< |
| Δ | 0.9≦ to 1.0≧ | 85≧ to 80≦ | 25≧ to 20≦ |
| x | 1.0< | 80> | 20> |

It is clear from Table 3 that, when the closed cell foam rate of the used molded article is lower than 50%, the recovery rate is inferior and the cells are not closed whereby the impact resistance lowers.

Examples 10–13 and Comparative Examples 13–16

The same operations as in Example 2 were carried out with the exception that the density of the foamed article was made 0.015 g/cm³. Changes with lapse of time of the content of the blowing agent in the resulting molded articles and the physical properties were measured and are given in Table 5.

TABLE 5

|  | Lapse of Days of Foamed Article (days) | Amt of Blowing Agent in Foamed Article (%) | Compressive Strength | Recovery Rate of Compressive Stress | Falling Ball Value |
|---|---|---|---|---|---|
| Comp. Ex. 13 | 2 | 4.5 | o | x | o |
| 14 | 3 | 4.0 | o | Δ | o |
| Example 10 | 5 | 3.5 | o | o | o |
| 11 | 20 | 2.0 | o | o | o |
| 12 | 40 | 1.3 | o | o | o |
| 13 | 90 | 0.5 | o | o | o |
| Comp. Ex. 15 | 210 | 0.2 | Δ | o | o |
| 16 | 300 | 0.1 | x | o | x |

Density of the molded foamed article: 0.015 g/cm³

The evaluating standard for the physical properties is the same as that in Table 4. The content of the blowing agent was measured by the same manner as given in Example 1.

(Merit of the Invention)

The foamed molded article in accordance with the present invention wherein the base resin particles are the styrene type resin particles obtained by a graft polymerization of cis-rich polybutadiene with a styrene type monomer, the blowing agent contained is mainly composed of n-pentane, the density is 0.015–0.040 g/cm³, the average cell diameter is 60 to 300 micrometers and the closed cell foam rate is 50% or more is with excellent elasticity and impact resistance.

Accordingly, the foamed molded article of the present invention can be suitably used in uses such as cushion packing materials and heat-insulating materials wherein elasticity and impact resistance are needed.

What is claimed is:

1. A method of manufacturing a foamed article which comprises:
   suspending styrene resin particles having a weight average molecular weight of about 200,000 to 400,000, which have been formed by a graft polymerization of monomers comprising:
   cis-rich polybutadiene, having a cis content of at least about 80% by weight and
   a styrene monomer in an aqueous medium;
   impregnating a blowing agent comprising at least about 50% n-pentane,. into said resin particles at the temperature of 100°–150° C. to obtain expandable resin particles containing 3–10% by weight of the blowing agent admixed with the resin particles;

pre-expanding the expandable particles; and molding the resulting pre-expanded particles in a mold to form said foamed article.

2. A method according to claim 1 in which the resin particles are in the form of cylindrical pellets.

3. A method according to claim 1 in which the expandable resin particles are in the form of spherical beads.

* * * * *